United States Patent [19]

Morris

[11] 4,337,657
[45] Jul. 6, 1982

[54] OIL LEVEL GAUGE

[76] Inventor: Benny G. Morris, 3053 Wood St., Portage, Ind. 46368

[21] Appl. No.: 177,197

[22] Filed: Aug. 11, 1980

[51] Int. Cl.³ ............................................. G01F 23/10
[52] U.S. Cl. ....................................... 73/313; 73/308; 340/624
[58] Field of Search ................... 73/313, 308; 340/624

[56] References Cited

U.S. PATENT DOCUMENTS

| | | | |
|---|---|---|---|
| 2,604,522 | 7/1952 | Monroe | 73/308 |
| 2,738,674 | 3/1956 | Perkins | 73/313 |
| 3,002,186 | 9/1961 | Schlangen | 73/313 X |
| 4,034,608 | 7/1977 | Vincent | 73/313 |

Primary Examiner—Stuart S. Levy
Assistant Examiner—Joseph W. Roskos
Attorney, Agent, or Firm—Oltsch, Knoblock & Hall

[57] ABSTRACT

An oil level indicator for use on a motor vehicle having a tube open at the vehicle oil pan. An elongated stiff oil gauging wire is slidably mounted in the tube. The wire carries a float at its lower end and extends at its upper end into a stationary housing mounted on the vehicle. The housing pivotally mounts a lever connected to a stiff wire and to the slidable contactor of a variable resistance member in the housing. The variable resistance member is connected to a battery and to a guage mounted at the dashboard of the motor vehicle to indicate the oil level in the oil pan.

1 Claim, 3 Drawing Figures

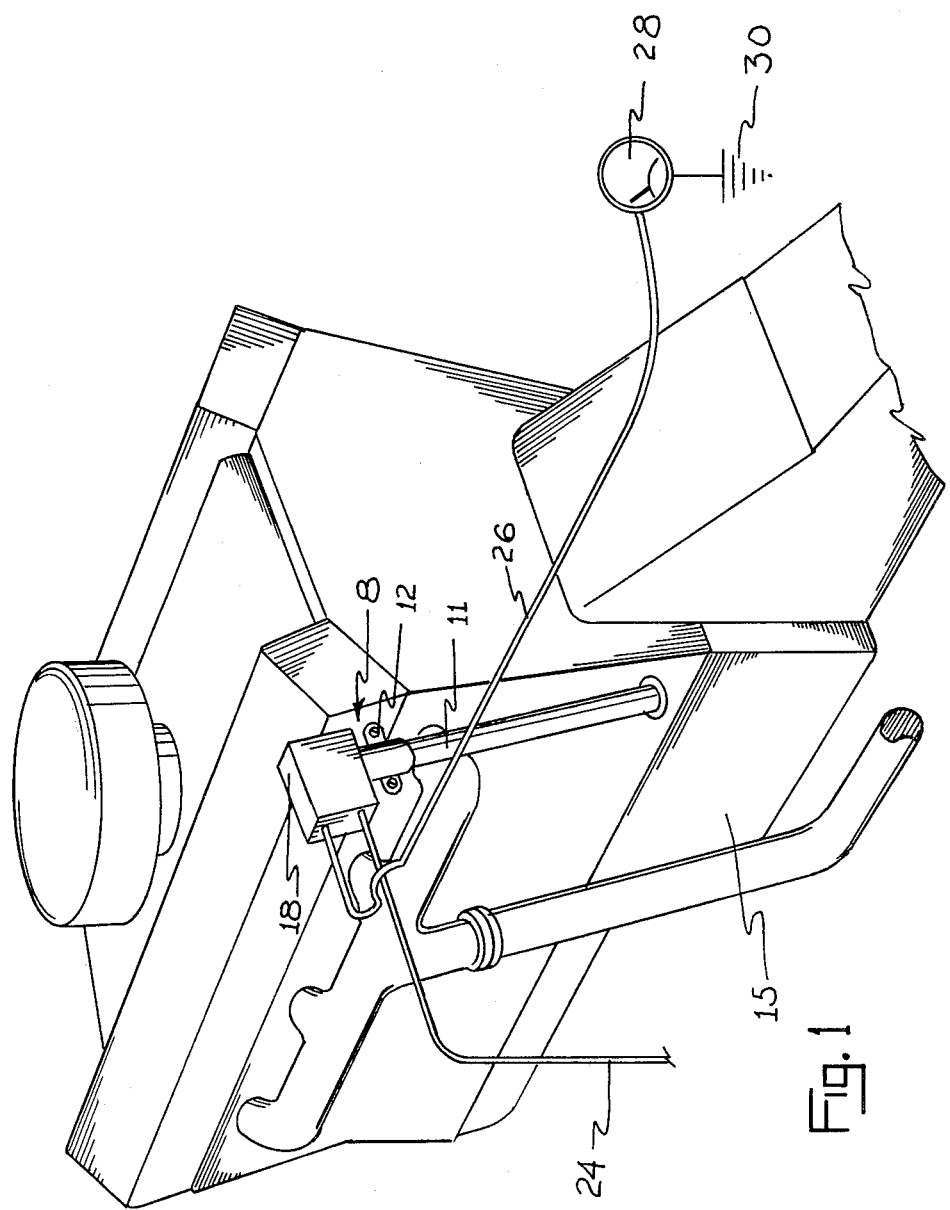

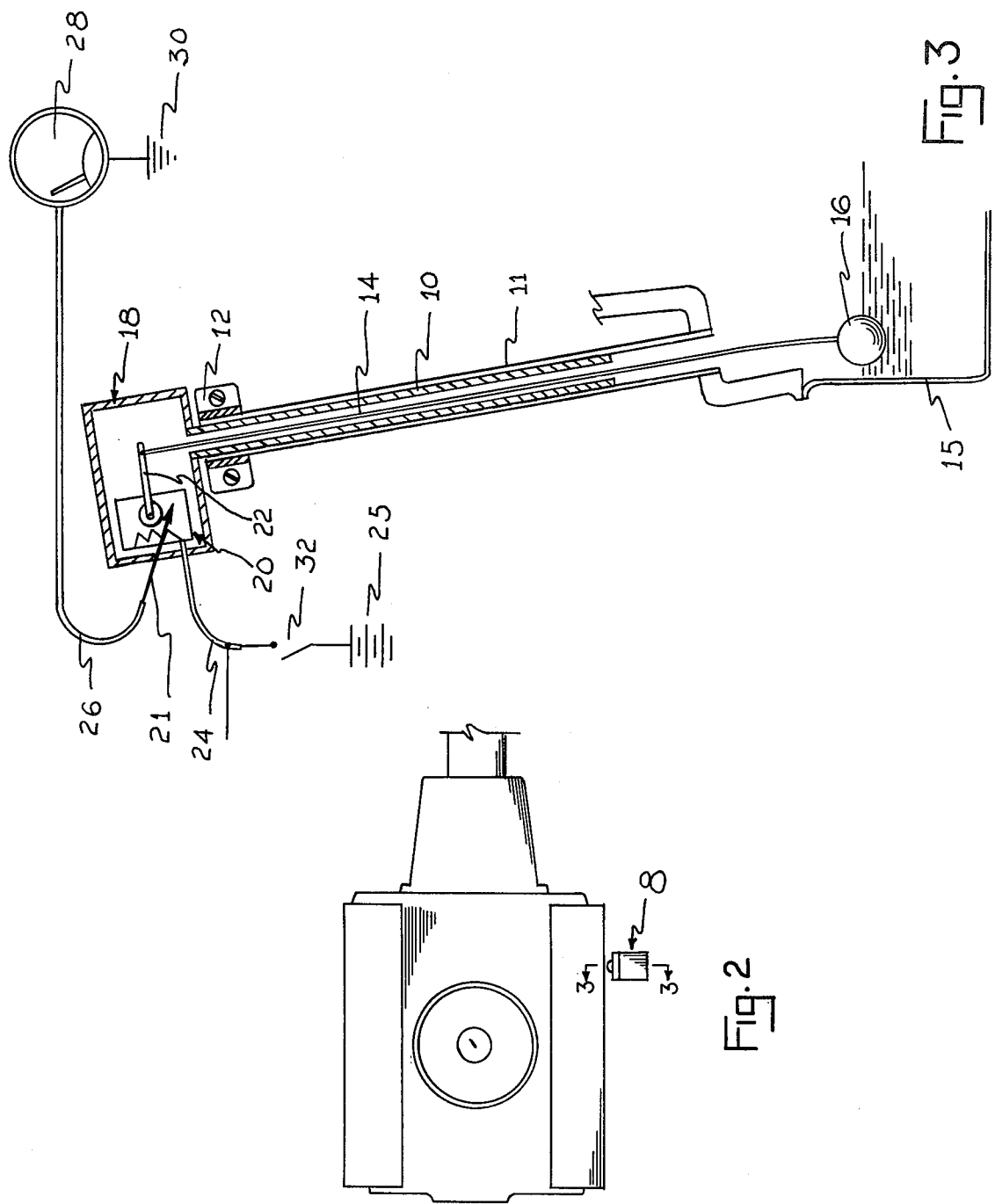

OIL LEVEL GAUGE

SUMMARY OF THE INVENTION

The invention of this application relates to an oil level indicator for use in a motor vehicle to indicate the level of oil in the oil pan of the vehicle. Heretofore it has been conventional practice to provide a motor vehicle with a manually operated dipstick gauge for determining the oil level in the oil pan of the vehicle. Thus the driver has no knowledge of the quantity of oil of variations of engine oil while the vehicle is being driven. The present device indicates the level of oil in a vehicle oil pan at all times. It has a housing which includes a tube which fits in the conventional tube which slidably receives a conventional dipstick. The housing tube may have a clamp for firmly securing the housing tube in position in the conventional dipstick tube. The housing tube slidably mounts a stiff wire which carries a float at its lower end to float in the oil contained in the oil pan. The housing includes a chamber portion at its upper end into which the float extends and which contains a variable resistor. The float wire is pivotally connected to shiftable lever which is connected to the shiftable contactor of the resistor. The resistor is interposed in an electrical circuit connected to the vehicle battery and to a gauge mounted at the dashboard of the vehicle. The gauge may be grounded at an appropriate spot on the car.

It is the primary object of this invention to provide an oil level indicator which functions and can be read from the inside of an automobile at all times that a vehicle ignition system is operative.

Another object of this invention is to provide an oil level indicator which can be mounted at the dipstick pipe of a vehicle and connected to an oil gauge and a battery easily and quickly.

Other objects of this invention will become obvious upon a reading of the following specification.

BRIEF DESCRIPTION OF THE DRAWINGS

FIG. 1 is a perspective view of the device in operative position on a vehicle.

FIG. 2 is a top plan view of the device.

FIG. 3 is a vertical sectional view taken on line 3—3 of FIG. 2, and schematically illustrates an electrical operating circuit.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use and to thereby enable others skilled in the art to best utilize the invention.

The oil level indicator 8 has a tube 10 which can fit inside a conventional dipstick pipe 11. An elongated stiff wire 14 is slidable within tube 10 and carries a float 16, made of aluminum or other light material, at its lower end. The wire 14 is of such length that float 16 extends into the engine oil pan 15 to float in the oil contained in the pan.

A housing 18 is mounted upon the upper end of the tube 10. The wire 14 extends into the housing 18. The housing 18 mounts a variable resistor 20 which has a slidable contactor 21 which is connected to a shiftable lever or arm 22 which is pivotally connected to the wire 14 so that endwise movement of the wire 14 changes the setting of the contactor 21 of resistor 20. The resistor 20 is connected by a lead 24 with the automobile battery 25 and by a lead 26 to a gauge 28. The gauge 28 may be mounted at the dashboard of a motor vehicle and is grounded at 30. The lead 24 has a switch 32, such as a conventional ignition switch, interposed therein.

The oil level indicator 8 can be installed in an automobile as an accessory or supplementary item of equipment by simply positioning the tube 10 in a selected adjustment in the dipstick pipe 11. The oil level indicator tube 10 and housing 18 may be held in position by a clamp 12 which secures the tube 10 to the dipstick pipe 11.

It will be seen that the gauge 28 will indicate the oil level in the oil pan when switch 32 is closed, the indication being a function of the setting of the contactor 21 of resistor 20 is controlled by the position of wire 14 and float 16.

It is understood that the invention is not to be limited to the preceding description but is comprehended to include any combination within the scope of the appended claims.

What I claim is:

1. A liquid level indicator for use on motor vehicles having an oil pan, a dip stick pipe and an electrical circuit including a battery, a switch and an electrically operable gauge, said indicator comprising a tube mounted in said dip stick pipe having an upper end and a lower end, said tube lower end being adjacent said oil pan, an elongated stiff wire having first and second ends and slidable endwise within said tube between said first and second ends, said first end extending from said tube lower end and carrying a ball float thereon bouyantly supported on the oil in the oil pan, said tube including a housing at said upper end, a variable resistor in said housing connected in said circuit, said wire second end extending from said tube upper end into said housing, said resistor having a shiftable contactor connected to the upper end of said wire, whereby endwise movement of said wire changes the setting of said resistor to activate said gauge when said circuit switch is closed, and means for adjustably fastening said indicator tube to said dipstick pipe at a selected longitudinal position relative to said stiff wire whereby said resistor may be set to give a reading on said gauge corresponding to the initial level of oil in said oil pan.

* * * * *